Dec. 30, 1952  H. L. CLARK  2,624,027
TENSION ADJUSTING APPARATUS
Filed Dec. 2, 1949
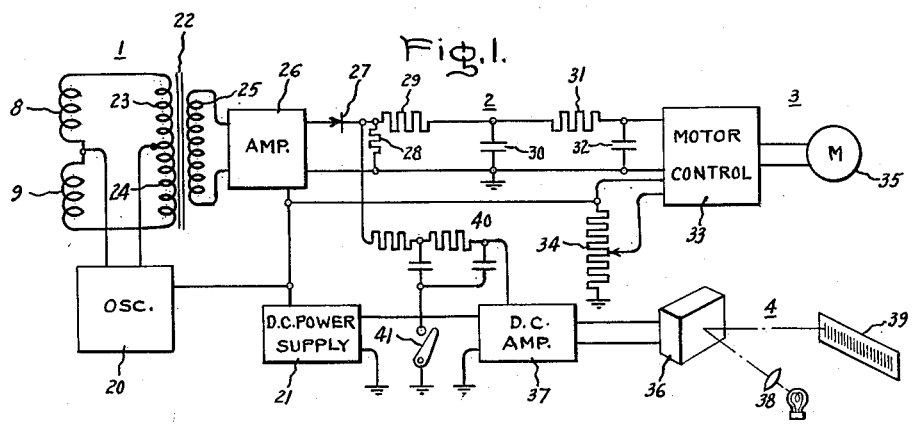
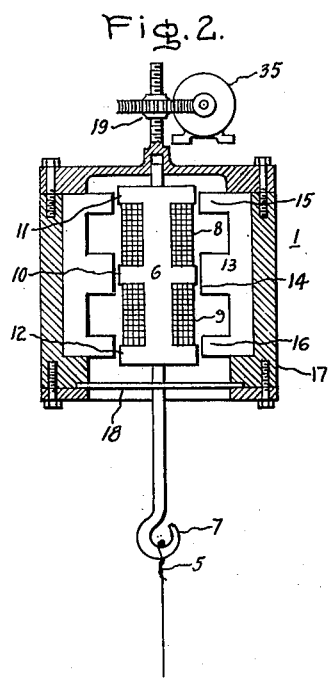
Inventor:
Howard L. Clark,
by Paul A. Franke
His Attorney.

Patented Dec. 30, 1952

2,624,027

UNITED STATES PATENT OFFICE 2,624,027

TENSION ADJUSTING APPARATUS

Howard L. Clark, Ballston Lake, N. Y., assignor to General Electric Company, a corporation of New York Application December 2, 1949, Serial No. 130,838

1 Claim. (Cl. 318—29)

My invention relates to a tension adjusting apparatus and has particular reference to apparatus for automatically restoring a given average tension to yarn under a tension having a vibratory component.

Where a length of yarn or similar material is subjected to vibrating tension, as may occur in testing or manufacturing processes, it is desirable to maintain a certain average tension for optimum process conditions. Due to elongation of the yarn it is usually necessary to continuously increase the tension to maintain its average value, which is rendered difficult due to the vibratory or oscillatory component of the tension.

It is an object of my invention to provide an improved automatic apparatus for holding a length of yarn or other material to a given average tension.

It is a further object of my invention to provide an automatic apparatus for maintaining a material under vibratory tension at a given average tension.

It is another object of my invention to provide an apparatus for indicating the average tension as well as the extent of the vibrational tension of yarn or other material.

Briefly described, my invention resides in the combination of a sensitive apparatus for producing a voltage proportional at each instant to the tension on a holder transmitted by the end of a length of yarn or other material, together with a circuit for rectifying and averaging the voltage to eliminate the alternating component and provide a signal suitable for controlling a motor which changes the position of the yarn holder to restore the yarn tension to the desired average value. In addition, a yarn tension indicator, energized by the alternating signal voltage mentioned, may be employed to indicate the average tension by insertion of an averaging circuit in the indicator input.

The features of which I desire to protect herein are pointed out with particularity in the appended claim. The invention itself, together with further objects and advantages thereof, may best be understood by reference to the following description taken in connection with the drawings in which Fig. 1 is a schematic diagram of a system embodying my invention and Fig. 2 represents a yarn holding apparatus.

Referring now to Fig. 1 my invention comprises generally a tension gage 1 for producing a voltage proportional to the instantaneous value of a vibratory tension on the yarn or other material together with rectifying and filtering circuits 2 for removing the alternating voltage component corresponding to the vibrational component of the tension and producing a direct current signal voltage having an amplitude corresponding to the average tension on the yarn. This voltage is compared with a selected voltage corresponding to the desired average tension and the resultant voltage is employed in a restoring system 3 for changing the position of the yarn holder until the resultant voltage is zero. An indicating circuit 4 provides an indication of either the amplitude of the vibratory oscillations in response to the alternating signal voltage or the amplitude of the average tension in response to the rectified and filtered direct voltage signal. A detailed description of my invention appears in the following paragraphs for the purpose of fully explaining the operation of the system.

As shown in Fig. 2 one end of a yarn 5 is held in a semi-fixed position. The yarn end holding apparatus is incorporated in the tension gage and comprises an upright armature 6 preferably fabricated from laminated strips of iron or other ferromagnetic material. The lower end 7 of the armature is suitably provided with a hook or other means for securing the yarn end 5.

Upper and lower inductive windings 8 and 9 on the armature 6 are connected in series but have impedances differing from each other in acordance with the displacement of the armature 6 by the yarn end 5. Accordingly a central armature flange 10 is provided between the two windings 8 and 9 together with upper and lower end flanges 11 and 12 which cooperate with the stationary cylindrical housing 13 surrounding the armature. The housing 13 is made of iron or other ferromagnetic material, preferably laminated, to complete the flux circuits of the upper and lower windings 8 and 9 and has a centrally disposed internal shoulder 14 extending towards the central flange 10 of the armature with a relatively small air gap therebetween. Similarly, upper and lower internal shoulders 15 and 16 in the cylindrical housing are arranged opposite the upper and lower armature flanges 11 and 12. However, in order to provide different impedances between the two armature windings when the armature is axially displaced from a central position with respect to the housing, the flanges and the shoulders of the flux circuits are not exactly aligned. The upper flange 11 is axially displaced a distance above the upper shoulder 15 while the lower flange 12 is displaced a distance below the lower shoulder 16 in order that axial displacement of the armature may decrease the reluctance of the flux circuit of one winding at the same time it is increasing the reluctance of the other.

The gage assembly 1 is enclosed in a casing 17 which permits axial movement of the armature 6 in accordance with the instantaneous amplitude of the tension imposed by the yarn end 5. This movement is restrained by a spring diaphragm 18 positioned across the lower end of the casing 17. The entire tension gage assembly 1 is raised or lowered through a worm and lead screw coupling 19 at the upper end of the casing to restore the yarn tension to the desired value as described in a folowing paragraph.

To excite the tension gage 1 an oscillator 20 which may be connected to a suitable source of voltage such as a direct current power supply 21 is connected to the common terminal of the gage windings 8 and 9 and to the common terminal of a pair of connected primary coils 23 and 24 of a differential transformer 22. The other ends of the gage windings 8 and 9 are connected respectively to the other ends of transformer windings 23 and 24. With the oscillator providing a carrier signal of a suitable frequency, preferably in the range of thousands of cycles per second so as to be many times the frequency of the yarn vibration, similar potentials will be maintained across the upper and lower coils of the gage when the armature 6 is in a neutral position. Under such a condition the net ampere-turns excitation of the differential transformer 22 is zero and no voltage will be excited in its secondary winding 25. However, with the gage armature displacement from its neutral or zero tension position as permitted by the gage diaphragm 18 when the yarn 5 is under tension, the respective reluctances of the flux paths for the upper and lower gage coils will differ, a higher voltage appearing across the coil having the higher impedance and a lower voltage appearing across the coil with a lower impedance. A differential voltage then results in the primary windings of the differential transformer 22 to produce an alternating current voltage in the secondary. This voltage is the sum of two alternating current voltages, one being a carrier voltage at the frequency of the oscillator 20 with its amplitude responsive to the average magnitude of the yarn tension and the other voltage has a frequency and amplitude proportional to the vibratory component of the yarn tension. The voltage is preferably amplified by an amplifier 26 which may be of a conventional type employing grid-controlled thermionic discharge devices.

The alternating voltage signal is then suitably rectified, as by a selenium rectifier 27, to provide a signal which comprises the rectified carrier signal on which is superposed a rectified varying component proportional to the instantaneous value of the tension on the yarn. The varying component substantially defines the envelope of the rectified signal and has a frequency equal to the vibratory frequency, which is but a fraction of the carrier frequency. The average value of this signal over one complete vibratory cycle corresponds to the average tension on the yarn and varies at a relatively slow rate, due to the gradual variation of tension due to stretching of the yard. Accordingly, an averaging circuit is employed to eliminate the carrier and vibratory alternating frequency components from the rectified signal in order to produce a steady state average voltage suitable for use in the restoring system 3. The averaging apparatus may suitably take the form of a resistance input filter in which a bleeder resistor 28 is connected across the rectifier output terminals, one of which is preferably grounded. In the ungrounded line a dropping resistor 29 is provided with one terminal connected to the bleeder resistor and the other to a capacitor 30 of a suitable value which is connected to by-pass the alternating component to ground. Bleeder resistor 28 and voltage dropping resistor 29 comprise a voltage dividing resistance input network of the filter. By choosing a suitable ratio between the resistance of the bleeder resistor 28 and the dropping resistor 29, which ratio may suitably be in the order of 1:10, an output voltage is obtained which is a measure of the average tension, the vibrational components being eliminated. A sufficiently high ohmic value of resistor 29 is chosen to allow the capacitor charging rate to be low enough to cut-off the alternating frequency components. Due to the relatively low bleeder resistance sufficient current is drained from the capacitor so that its voltage charge follows the variations in voltage due to the gradual change in the average tension of the yarn. At least two stages of dropping and by-pass capacitance are preferably employed, resistor 31 and capacitor 32 comprising the second stage. Additional stages may be employed for producing a smoother wave form.

The varying direct-current voltage thus obtained is suitable for the tension restoring apparatus 3. A motor control circuit 33, which may be of suitable type of various well-known motor speed control systems, operates in a conventional manner to compare the input signal voltage against a pre-set voltage obtained from a slide-wire potentiometer 34 or other suitable source. The pre-set voltage is adjusted to correspond with the voltage which is produced by the desired average tension. The difference voltage is utilized in the motor control system so as to cause the motor 35 to be driven in the correct direction and at the desired speed or for a desired time to raise or lower the gage apparatus 1 through the worm and lead screw 19. The yarn tension is accordingly modified since the yarn end 5 is held by the gage apparatus and the differential voltage at the motor control is reduced to zero, thus stopping the tension-changing mechanism. Since the average tension of the yarn changes but slowly due to stretching of the yarn, a restoring system 3 such as shown is adequate in speed for maintaining the desired tension.

In addition to the restoring mechanism the amplitude of the yarn tension is also indicated at 4 by feeding the rectified signal voltage to a galvanometer 36, preferably through a direct current amplifier 37. The galvanometer 36 may suitably be of the oscillograph type having a mirror mounted on its armature for reflecting a light beam from a suitable external source 38 on a calibrated scale 39. The difference between the galvanometer maximum and minimum scale readings indicates the magnitude of the vibrational tension component.

To facilitate obtaining an indication of the average tension, an additional averaging circuit 40 comprising input dropping resistor and by-pass capacitor sections as previously described is connected between the rectifier and the indicator circuit input with a switch 41 between the filter and ground in order that either the average tension signal or the vibrational displacement signal may be selected as desired.

While the present invention has been described by reference to a particular embodiment thereof, it will be understood that numerous modifications may be made by those skilled in the art without actually departing from the invention. I, therefore, aim in the appended claim to cover all such equivalent variations as come within the true spirit and scope of the foregoing disclosure.

What I claim as new and desire to secure by Letters Patent of the United States is:

In combination, holding means for a length of yarn under a tension having a vibratory component, tension responsive means incorporated in said holding means for producing a voltage corresponding to the instantaneous value of said tension, means for rectifying said voltage, filter means having a voltage dividing resistance input network and having a cut-off frequency below the frequency of said vibratory component of said yarn tension, whereby the amplitude of the filtered voltage signal varies in accord with the average value of said yarn tension, means for establishing a voltage standard corresponding to a desired average magnitude of said yarn tension, and restoring means responsive to the difference voltage between said filtered voltage signal and said standard for displacing said holding means until said difference voltage is substantially zero.

HOWARD L. CLARK.

REFERENCES CITED

The following references are of record in the file of this patent:

UNITED STATES PATENTS

| Number | Name | Date |
| --- | --- | --- |
| 2,357,745 | Kliever | Sept. 5, 1944 |
| 2,445,880 | Hathaway et al. | July 27, 1948 |

FOREIGN PATENTS

| Number | Country | Date |
| --- | --- | --- |
| 257,634 | Great Britain | Apr. 21, 1927 |
| 536,063 | Great Britain | May 1, 1941 |
| 876,386 | France | Nov. 4, 1942 |